Nov. 9, 1926.

H. A. SEARLE 1,606,727

EXTRUDER FOR GREASE CONTAINERS

Filed April 14, 1924  2 Sheets-Sheet 1

Inventor
Harry A. Searle
By Edwin S. Clarkson
Attorney

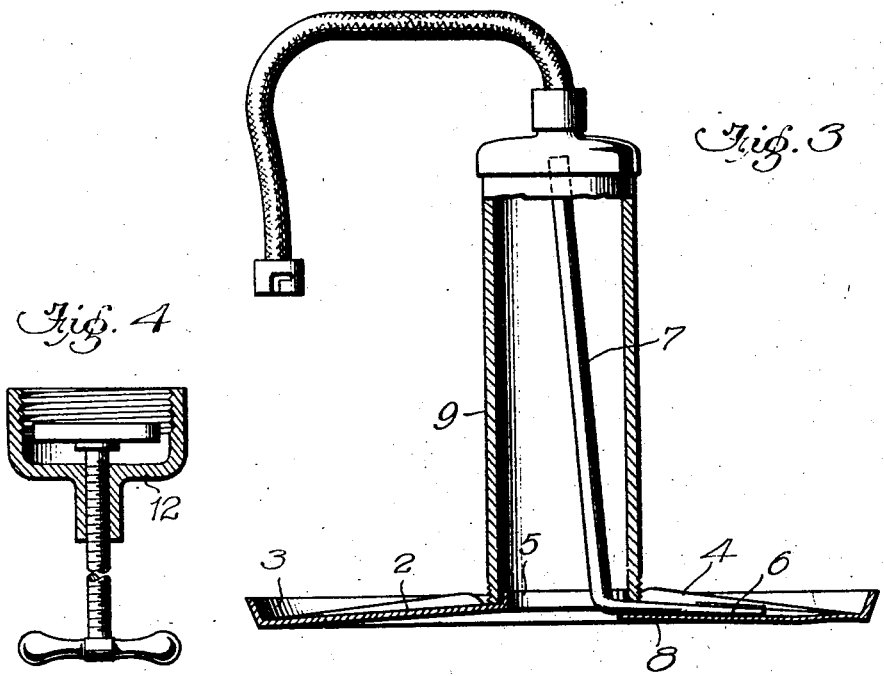
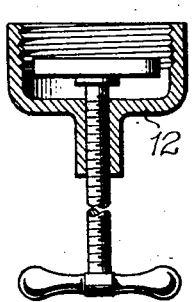
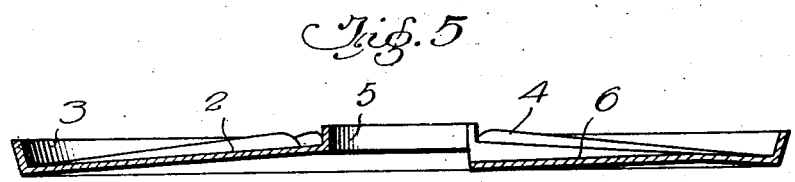
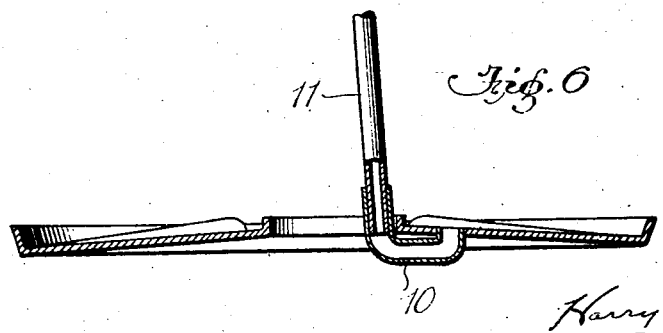

Patented Nov. 9, 1926.

1,606,727

UNITED STATES PATENT OFFICE.

HARRY A. SEARLE, OF COUNCIL BLUFFS, IOWA.

EXTRUDER FOR GREASE CONTAINERS.

Application filed April 14, 1924. Serial No. 706,490.

The use of grease pressure systems on automobiles is becoming more universal every day, the majority of new cars being equipped with such pressure systems. There are several types of what is known as grease guns on the market adapted for service with the pressure grease system of automobiles. These grease guns comprise a grease holding body within which is mounted a piston, or plunger, which is forced downwardly against the body of grease whereby the grease is expelled from the container gun body through a flexible hose connected at the opposite ends, said flexible hose being connected to the suitable grease cups and the like on the automobile.

It is extremely difficult to compactly fill these grease guns with grease because air is trapped in the gun by the grease which prevents the grease gun from becoming fully filled with grease. The air cannot escape through the flexible hose because the hose is filled with grease, therefore, the only way in which to get rid of the air in the present gun is to remove the hose which is more or less inconvenient.

Grease cartridges have been placed on the market which are adapted to be telescoped over the grease gun leaving the contents of the package in the gun providing some means has been devised to get rid of the air in the gun as the grease is being forced therein. A cartridge with an air vent has been devised to get rid of the air cushion and is a successful device, but naturally the price of grease in such cartridges is necessarily greater than it can be purchased for in bulk.

The object of my invention is to provide a container in which grease can be sold in bulk, as, for instance, in five pound lots, said container having means whereby the grease gun can be compactly filled directly from the container, said means providing for the escape of air from the grease gun as it is being filled with the grease, thus enabling me to give customers the benefit of bulk prices and also giving them the benefit of the convenience and cleanliness of the grease cartridge.

A further object of my invention is to pack within the container my improved means and seal it in the package by the usual package cover; and with these and other objects in view, my invention consists of the parts and combination of parts as will be hereinafter more fully set forth.

In the drawings:

Figure 3 is a vertical sectional view through my improved extruder detached and assembled with the grease gun.

Figure 4 is a detail view of the plunger end of the gun removed.

Figure 5 is a transverse sectional view of my extruder.

Figure 6 is a transverse sectional view of another embodiment of my extruder.

Figure 1:
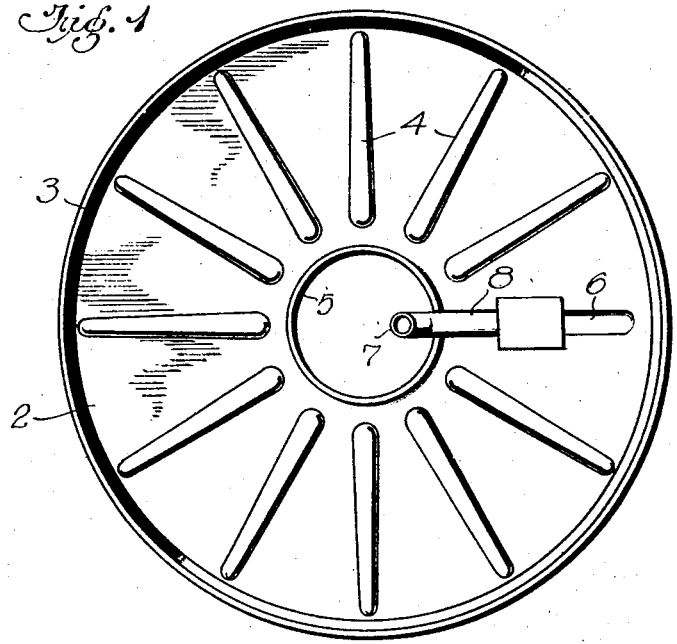
Figure 1 is a top plan view of my improved extruder.

The reference numeral 1 represents a commercial straight side grease container which may be provided with any suitable commercial cover.

My improved grease extruder consists of a disk 2 having a vertical flange 3 at its perimeter, which flange is slightly inclined outwardly from the vertical and is designed to have a tight but easy sliding fit with the inner face of the walls of the container 1 whereby it functions not only to keep the grease from passing up around the perimeter of the extruder, but also functions as a wiper, to wipe the grease clean from the inner face of the wall of the container. This extruder 2 is provided with suitable corrugations 4, which function as beams to stiffen the extruder disk 2 and prevent it from buckling or bending when in use.

A central opening is formed through the extruder 2 around which is disposed a vertical flange 5, which flange is spaced from the inner ends of the corrugations 4.

The extruder 2 is provided with a port 6, which port may be formed by depressing the upper face of the disk 2 in the form of a corrugation, said corrugation opening on the top of the disk 2. 7 is an air vent tube bending at its lower end as at 8 and extended into the corrugation 6 and opening to atmospheric air. The air vent 7 is designed to be of such length that it will, when a grease gun is inverted over it, extend substantially to the upper end of the inverted grease gun 9 whereby any air trapped in the end of the grease gun 9 is conveyed by the air tube 7 and branch 8 to atmosphere.

It will, of course, be understood that the air tube 7 is readily detachable from the operative position shown in the drawings and may be packed flat on top of the extruder disk 2 in the grease container.

As will be seen from Figure 6, I may solder, or otherwise readily fix to the extruder 2, an air vent 10 in the upper end of which I can telescope an extension tube 11 so that the extension tube 11 may be readily detached from the extruder 2 for the purpose of packing and shipping.

Figure 2:
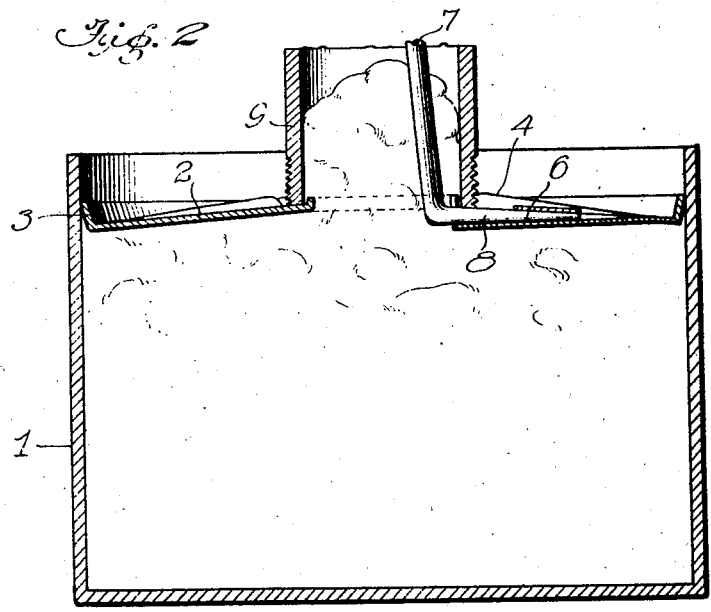
Figure 2 is a vertical sectional view of a grease container showing my invention in operation.

The plunger end 12 of the grease gun having been removed, the grease gun is inverted with its open end, as shown in Figures 1 and 3, telescoped outside of the flange 5 of the disk 2 in which position the air vent tube 7 extends substantially to the top of the grease gun. Now, in order to fill the grease gun 9 the operator presses upon the upper end of the grease gun which in turn exerts pressure on the disk 2 whereby the disk 2 is forced down upon the body of grease in the container 1 and the grease is displaced and readily flows through the center opening of the disk 2 up into the body of the grease gun, as is illustrated in Figure 2. Continuing the downward pressure on the gun 9 the air trapped in the gun above the grease escapes through the vent pipe 7 to atmosphere, thus enabling the operator to compactly and completely fill the grease gun with grease from the container 1 without soiling his hands and without loss of any grease.

The extruder disk 2 may be formed in many ways and of various diameters for the different sized grease containers.

It will be noted from the drawings that the edge of the open end of the grease gun, when in position to be filled, rests on the extruder disk 2 between the flange 5 and the inner ends of the corrugations.

It is quite obvious that many changes may be made in the details of construction and relative arrangement without departing from the scope of the appended claims.

What I claim is:

1. A grease extruder for use in an open can of grease for extruding grease from the can into a grease gun by downward pressure of the extruder on the grease, said extruder comprising a disc having a central grease extruding opening, an air tube mounted on said disc one end of which opens on top of the disc while the upper portion of the tube extends upwardly through the said grease opening in the disc to a point above the disc.

2. A grease extruder comprising a disc having an upturned flange on its perimeter, a grease extruding port through the disc, an upstanding flange around said port, and an air tube open at one end on top of the disc, the body portion of the tube extending upwardly through said port inside of said annular flange to a point above the said flange and disc.

In testimony whereof I affix my signature.

HARRY A. SEARLE.